(12) United States Patent
Ichimura et al.

(10) Patent No.: US 7,826,147 B2
(45) Date of Patent: Nov. 2, 2010

(54) ZOOM LENS AND IMAGE PROJECTION APPARATUS

(75) Inventors: Junya Ichimura, Utsunomiya (JP); Kazuhiro Inoko, Utsunomiya (JP); Saburo Sugawara, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/563,700

(22) Filed: Sep. 21, 2009

(65) Prior Publication Data

US 2010/0073775 A1    Mar. 25, 2010

(30) Foreign Application Priority Data

Sep. 24, 2008    (JP) .............................. 2008-244536

(51) Int. Cl.
*G02B 15/14* (2006.01)

(52) U.S. Cl. ....................................... 359/676; 359/683

(58) Field of Classification Search .................. 359/676, 359/683

See application file for complete search history.

(56) References Cited

U.S. PATENT DOCUMENTS 6,785,055 B2    8/2004    Nishikawa et al.

2001/0050818 A1*    12/2001    Wada et al. .................. 359/649
2005/0036206 A1*    2/2005    Wada .......................... 359/676
2009/0015934 A1*    1/2009    Amano ........................ 359/649

FOREIGN PATENT DOCUMENTS

| JP | 2002-350727 A | 12/2002 |
| JP | 2004-085979 A | 3/2004 |
| JP | 2008-052174 A | 3/2008 |

\* cited by examiner

*Primary Examiner*—Scott J Sugarman
(74) *Attorney, Agent, or Firm*—Canon U.S.A., Inc. I.P. Division

(57)    ABSTRACT

A zoom lens includes a negative lens unit having a negative refractive power, at least one positive lens unit having a positive refractive power, an intermediate lens unit including a stop, and at least one reduction side lens unit, in order from a magnification conjugate side to a reduction conjugate side, at least two magnification side movable lens units in the negative lens unit and the at least one positive lens unit, and at least one reduction side movable lens unit in the at least one reduction side lens unit are moved during zooming, and conditions of $0.9 < (X_T \cdot \beta_{Tb} \cdot \phi_W)/(X_W \cdot \beta_{Wb} \cdot \phi_T) < 1.1$, $0.9 < \phi_W/\phi_T < 1.1$, $0.8 < (\beta_{TS} \cdot \beta_{Tb})/(\beta_{WS} \cdot \beta_{Wb}) < 1.2$, and $1.4 < f_T/f_W$ are satisfied.

9 Claims, 7 Drawing Sheets

EMBODIMENT 1 LENS CROSS-SECTIONAL DIAGRAM

EMBODIMENT 1   ABERRATION DIAGRAM

| R | - - - - - - | 620 NM |
| G | ——— | 550 NM |
| B | — - — - — | 470 NM |

WIDE ANGLE END

SPHERICAL ABERRATION
FNO=2.0

ASTIGMATISM
2ω=46.8°

DISTORTION (%)
2ω=46.8°

TELEPHOTO END

SPHERICAL ABERRATION
FNO=2.1

ASTIGMATISM
2ω=27.0°

DISTORTION (%)
2ω=27.0°

EMBODIMENT 2    ABERRATION DIAGRAM

| R | - - - - - - | 620 NM |
| G | ——— | 550 NM |
| B | - · - · - · | 470 NM |

WIDE ANGLE END

SPHERICAL ABERRATION
FNO=2.00

ASTIGMATISM
2ω=46.8°

DISTORTION (%)
2ω=46.8°

TELEPHOTO END

SPHERICAL ABERRATION
FNO=2.07

ASTIGMATISM
2ω=27.0°

DISTORTION (%)
2ω=27.0°

EMBODIMENT 3 ABERRATION DIAGRAM

| R | - - - - - - - | 620 NM |
| G | ———— | 550 NM |
| B | - · - · - · | 470 NM |

WIDE ANGLE END

SPHERICAL ABERRATION
FNO=2.00

ASTIGMATISM
2 ω =46.8°

DISTORTION (%)
2 ω =30.2°

TELEPHOTO END

SPHERICAL ABERRATION
FNO=2.04

ASTIGMATISM
2 ω =30.2°

DISTORTION (%)
2 ω =30.2°

ZOOM LENS AND IMAGE PROJECTION APPARATUS

BACKGROUND OF THE INVENTION

1. Field of the Invention

The present invention relates to a zoom lens suitable for a projection lens which is used for an image projection apparatus such as a liquid crystal projector.

2. Description of the Related Art

In an image projection apparatus which modulates each of lights of three colors such as R, G, and B using a light modulation device such as a liquid crystal panel to synthesize and project the modulated lights, a color synthesis device (a dichroic film, or an optical device having a polarization separating film) for synthesizing the lights of the three color is arranged between the light modulation device and a projection lens. Therefore, the projection lens (zoom lens) preferably has a long back focus and is preferably telecentric at a liquid crystal panel side. Further, because the image projection apparatus is required for obtaining a higher zoom ratio and a higher luminance of a projection image, a projection lens with small (bright) F-number and with high zoom ratio is required.

U.S. Pat. No. 6,785,055, and Japanese Patent Laid-open Nos. 2008-052174 and 2004-085979 disclose a projection lens with a small F-number change in accordance with zooming.

However, the projection lens disclosed in U.S. Pat. No. 6,785,055 and Japanese Patent Laid-open No. 2008-052174 has a small zoom ratio, and recent needs for a high variable magnification are not satisfied.

The projection lens disclosed in Japanese Patent Laid-open No. 2004-085979 is provided with a stop (a variable stop) whose opening diameter is variable to reduce the change of the F-number in accordance with the zooming, but the configuration of the projection lens is complicated by providing the variable stop.

When the modulated three colored lights are projected on a plane to be projected, the three colored projection images formed by the three colored lights are required to precisely overlap with one another. Therefore, a color displacement (chromatic aberration of magnification) generated by the projection lens needs to be appropriately corrected in a visible light range. Further, a distortion by the projection lens needs to be appropriately corrected so that an outline of the projection image is not distorted.

BRIEF SUMMARY OF THE INVENTION

The present invention provides a zoom lens having a high variable magnification ratio and reducing a change of F-number in accordance with zooming without a variable stop and an image projection apparatus using the zoom lens.

A zoom lens as one aspect of the present invention comprises, in order from a magnification conjugate side to a reduction conjugate side, a negative lens unit having a negative refractive power, at least one positive lens unit having a positive refractive power, an intermediate lens unit including a stop, and at least one reduction side lens unit. At least two magnification side movable lens units out of the negative lens unit and the at least one positive lens unit, and at least one reduction side movable lens unit out of the at least one reduction side lens unit are moved during zooming. The following conditions are satisfied:

$$0.9 < (X_T \beta_{Tb} \phi_W)/(X_W \beta_{Wb} \phi_T) < 1.1$$

$$0.9 < \phi_W/\phi_T < 1.1$$

$$0.8 < (\beta_{TS} \beta_{Tb})/(\beta_{WS} \beta_{Wb}) < 1.2$$

$$1.4 < f_T/f_W$$

where $X_W$ indicates an interval between a focal position at a wide angle end, of a front synthetic system constituted by lens elements arranged at the magnification conjugate side as compared with the stop, and the stop, $\beta_{Wb}$ indicates an imaging magnification at the wide angle end, of a rear synthetic system constituted by lens elements arranged at the reduction conjugate side as compared with the stop, $\beta_{WS}$ indicates an imaging magnification of the intermediate lens unit at the wide angle end, $\phi_W$ indicates a diameter of the stop at the wide angle end, $X_T$ indicates an interval between a focal position at a telephoto end, of the front synthetic system, and the stop, $\beta_{Tb}$ indicates an imaging magnification at the telephoto end, of the rear synthetic system, $\beta_{TS}$ indicates an imaging magnification of the intermediate lens unit at the telephoto end, $\phi_T$ indicates a diameter of the stop at the telephoto end, $f_W$ indicates a focal distance of a whole zoom lens system at the wide angle end, and $f_T$ indicates a focal distance of the whole zoom lens system at the telephoto end.

An image projection apparatus as another aspect of the present invention comprises a light modulation device configured to modulate light, and the above zoom lens configured to project the light from the light modulation device onto a plane to be projected.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Embodiment 1

Figure 1:
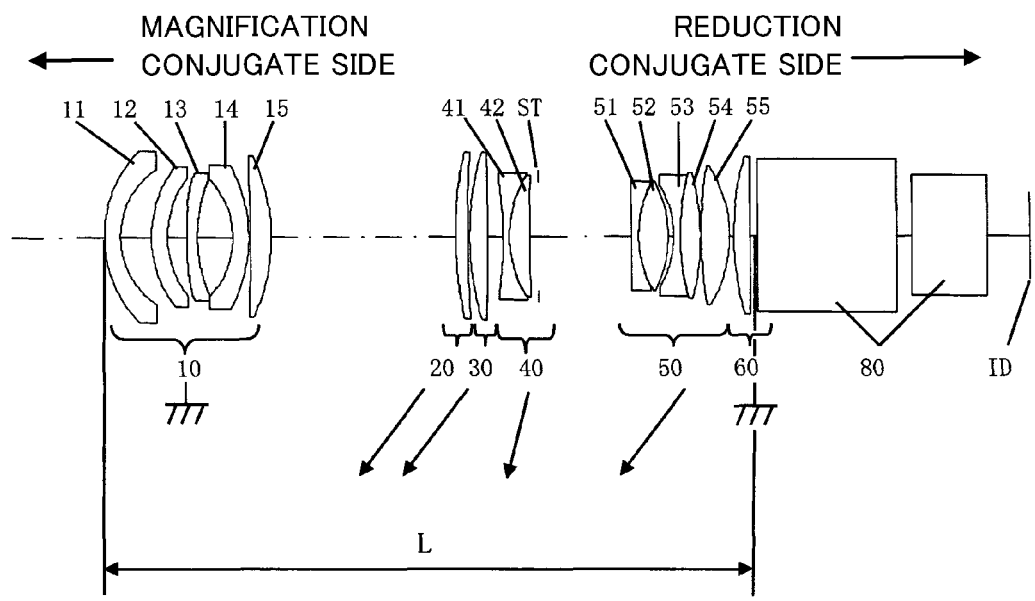
FIG. 1 is a cross-sectional diagram showing a configuration of a zoom lens that is Embodiment 1 of the present invention.

FIG. 1 shows an optical configuration of a zoom lens at a wide angle end that is Embodiment 1 of the present invention. The zoom lens of the present embodiment is used as a projection lens of an image projection apparatus such as a liquid crystal projector. Therefore, in addition to the optical configuration of the zoom lens, a part of components of the image projection apparatus is also shown in FIG. 1. These are true for Embodiments 2 and 3 (FIGS. 3 and 5) described later.

The zoom lens of the present embodiment includes first to sixth lens units 10 to 60 in order from a magnification conjugate side (a side of a plane to be projected in the image projection apparatus: also referred to simply as a magnification side) to a reduction conjugate side (a side of a light modulation device such as a liquid crystal panel in the image projection apparatus: also referred to simply as a reduction side). The first to sixth lens units 10 to 60 include a total of fifteen lens elements.

The first to sixth lens units 10 to 60 have refractive powers of negative, positive, positive, negative, positive, and positive, respectively. The refractive power is an inverse of a focal distance, and it can also be referred to as an optical power when a diffraction grating or the like is attached to each surface of the lens unit.

The first lens unit 10 corresponds to a "negative lens unit", and the second and third lens units 20 and 30 correspond to an "at least one positive lens units". The second and third lens units 20 and 30 are also referred to as a variable magnification lens unit. The fourth lens unit 40 corresponds to an "intermediate lens unit" including a stop ST. The first to third lens units 10 to 30 are a magnification side lens unit which is arranged at the magnification conjugate side as compared with the fourth lens unit 40 (stop ST). The fifth and sixth lens units 50 and 60 correspond to an "at least one reduction side lens unit" which is arranged at the reduction conjugate side as compared with the fourth lens unit 40 (stop ST).

In the zoom lens of the present embodiment, when zooming from a wide angle end to a telephoto end is performed, the second, third, fourth and fifth lens units 20 to 50 are moved in respective arrow directions in FIG. 1. In other words, the second and third lens units (magnification side movable lens unit) 20 and 30 out of the magnification side lens unit and the fifth lens unit (reduction side movable lens unit) 50 out of the reduction side lens unit moves.

Both the first lens unit 10 and the sixth lens unit 60 do not move (are fixed) during zooming.

The first lens unit 10, which is arranged at a position closest to the magnification conjugate side, includes five lens elements 11 to 14 of negative, negative, negative, negative, and positive in order from the magnification conjugate side to the reduction conjugate side. Both surfaces of the lens element 13 are aspheric surfaces.

Each of the second lens unit 20 and the third lens unit 30 includes one positive lens element.

The fourth lens unit 40 is configured as a cemented lens element formed by cementing a negative lens element 41 and a positive lens element 42 which are arranged in order from the magnification conjugate side to the reduction conjugate side. The stop ST is arranged at the reduction conjugate side as compared with the cemented lens element.

The fifth lens unit 50 includes a cemented lens element of negative and positive lens elements 51 and 52, a cemented lens element of negative and positive lens elements 53 and 54, and a positive lens element 55, which are arranged in order from the magnification conjugate side to the reduction conjugate side.

The sixth lens unit 60, which is arranged at a position closest to the reduction conjugate side, includes one positive lens element.

The zoom lens of the present embodiment satisfies the following conditions.

$$0.9 < (X_T \cdot \beta_{Tb} \cdot \phi_W)/(X_W \cdot \beta_{Wb} \cdot \phi_T) < 1.1 \tag{1}$$

$$0.9 < \phi_W/\phi_T < 1.1 \tag{2}$$

$$0.8 < (\beta_{TS} \cdot \beta_{Tb})/(\beta_{WS} \cdot \beta_{Wb}) < 1.2 \tag{3}$$

$$1.4 < f_T/f_W \tag{4}$$

In the above conditions, $X_W$ indicates an interval between a focal position at the wide angle end, of a front synthetic system (front group) constituted by lens elements (lens elements 11 to 42 in Embodiment 1) arranged at the magnification conjugate side as compared with the stop ST, and the stop ST. The focal position means a condensing position of a parallel light beam which enters the lens elements described above. $\beta_{Wb}$ indicates an imaging magnification at the wide angle end, of a rear synthetic system (rear group) constituted by lens elements (lens elements 51 to 60 in Embodiment 1 and 2, lens elements 41 to 50 in Embodiment 3) arranged at the reduction conjugate side as compared with the stop ST. $\beta_{WS}$ indicates an imaging magnification of the intermediate lens unit (the fourth lens unit 40 in the present embodiment) at the wide angle end. $\phi_W$ indicates a diameter of the stop ST (stop opening size) at the wide angle end.

$X_T$ indicates an interval between a focal position of a telephoto end, of the front synthetic system (front group) constituted by the lens elements at the magnification conjugate side as compared with the stop ST, and the stop ST. $\beta_{Tb}$ indicates an imaging magnification at the telephoto end, of the rear synthetic system (rear group) constituted by the lens element arranged at the reduction conjugate side as compared with the stop ST. $\beta_{TS}$ indicates an imaging magnification of the intermediate lens unit at the telephoto end. $\phi_T$ indicates a diameter of the stop ST at the telephoto end.

Further, $f_W$ indicates a focal distance of a whole zoom lens system at the wide angle end (whole of the first to sixth lens units 10 to 60 in the present embodiment), and $f_T$ indicates a focal distance of the whole zoom lens system at the telephoto end.

In the condition (1), $(X_T \cdot \beta_{Tb} \cdot \phi_W)/(X_W \cdot \beta_{Wb} \cdot \phi_T)$ is obtained by the product of $X_T/X_W$, $\beta_{Tb}/\beta_{Wb}$, and $\phi_W/\phi_T$. $X_T/X_W$ is a ratio of intervals between the focal position formed by the lens element at the magnification conjugate side as compared with the stop ST, and the stop ST at the wide angle end and at the telephoto end. $\beta_{Tb}/\beta_{Wb}$ is a ratio of imaging magnifications by the lens element at the reduction conjugate side as compared with the stop ST at the wide angle end and at the telephoto end.

When $(X_T \cdot \beta_{Tb} \cdot \phi_W)/(X_W \cdot \beta_{Wb} \cdot \phi_T)$ satisfies the condition (1), changes of F-number (brightness) in accordance with zooming can be reduced while a stop opening diameter is substantially constant as described later (without using a variable stop). When $(X_T \cdot \beta_{Tb} \cdot \phi_W)/(X_W \cdot \beta_{Wb} \cdot \phi_T)$ is beyond a range of the condition (1), reducing the changes of F-number in accordance with the zooming is difficult if the stop opening diameter is substantially constant.

Generally, when a variable magnification ratio is large, a moving amount of the lens unit and $X_T/X_W$ in the condition (1) are greatly changed. In this case, a function of correcting an image point in accordance with the zooming has to be given to the lens unit at the reduction conjugate side rather than the stop ST, and it is difficult to perform a good aberration correction. Therefore, in the present embodiment, at least two lens units which perform the zooming and the correction of the image point are configured to be moved at the magnification conjugate side as compared with a lens unit including the stop ST.

The condition (2) indicates that the stop opening diameter is substantially constant, i.e. shows little change, during the zooming between the wide angle end and the telephoto end. $\phi_W/\phi_T$ is preferably as close as possible to 1.

Reducing the change of the F-number is equivalent to illuminating (lessening) the F-number at the telephoto end. In this case, however, there is a possibility that a spherical aberration may be extremely large at the telephoto end. In particular, when a high variable magnification ratio and a large diameter are required, a height of an on-axis light beam in the variable magnification lens unit is extremely large at the telephoto end as compared with the wide angle end, and the aberration correction is difficult only by the shape of the lens unit closer to the magnification conjugate side than the lens unit including the stop ST.

In the present embodiment, the first lens unit 10 has a negative refractive power. Therefore, the second and third lens units 20 and 30 that constitute a variable magnification lens unit necessarily have a positive refractive power. In this case, however, the difference of the height of the on-axis light beam between the wide angle end and the telephoto end is larger, and the aberration correction is difficult.

Therefore, in the present embodiment, a lens unit having a large moving amount (fifth lens unit 50) is arranged at the reduction conjugate side as compared with the lens unit including the stop ST, and an aberration correction function is given to the lens unit.

The condition (3) is a condition for performing a good aberration correction in a zoom lens in which a change of the F-number in accordance with the zooming is suppressed. When satisfying the condition (1), an angle change of the on-axis light beam at an incident side and at an emission side of the reduction conjugate side as compared with the stop ST can be suppressed so as to be reduced. As a result, at the time of performing the zooming, the change of the spherical aberration in the lens unit at the reduction conjugate side as compared with the stop ST can be reduced.

When $\beta_{Tb}/\beta_{Wb}$ is greatly changed as compared with 1 by performing the zooming, a good aberration correction effect can not be easily obtained because $X_T/X_W$ needs to be greater to satisfy the condition (1).

The condition (4) indicates a variable magnification ratio of the zoom lens. When the variable magnification ratio is small, a change of the F-number can also be reduced because a moving amount of each lens unit is small. Therefore, when $f_T/f_W$ is a variable magnification ratio which is smaller than the range of the condition (4), in order to satisfy the conditions (1), (2), and (3), the configuration of the present embodiment does not have to be adopted.

The conditions (1) to (4) preferably satisfy the following conditions (1a) to (4a), respectively.

$$0.95<(X_T \cdot \beta_{Tb} \cdot \phi_W)/(X_W \cdot \beta_{Wb} \cdot \phi_T)<1.08 \quad (1a)$$

$$0.95<\phi_W/\phi_T<1.05 \quad (2a)$$

$$0.89<(\beta_{TS} \cdot \beta_{Tb})/(\beta_{WS} \cdot \beta_{Wb})<1.17 \quad (3a)$$

$$1.50<f_T/f_W<2.00 \quad (4a)$$

Only upper limit values or lower limit values of the conditions (1) to (4) may be replaced with upper limit values or lower limit values of the conditions (1a) to (4a), respectively.

The zoom lens of the present embodiment preferably satisfies the following condition (5).

$$80<ff<800 \quad (5)$$

In the condition (5), ff is a focal length of a synthetic system formed by synthesizing the negative lens unit (the first lens unit 10), the at least one positive lens unit (the second lens unit 20 and the third lens unit 30), and the intermediate lens unit (the fourth lens unit 40).

In order to perform a good aberration correction, it is necessary to heighten the on-axis light beam and lower an off-axis principal light beam in the lens unit at the reduction conjugate side as compared with the stop ST when the zooming from the wide angle end to the telephoto end is performed. Therefore, the on-axis light beam which enters the lens unit at the reduction conjugate side as compared with the stop ST preferably forms a light beam which converges to the reduction conjugate side in the range of the condition (5). When ff is beyond the upper limit value of the condition (5), the aberration correction effect by the lens unit at the reduction conjugate side as compared with the stop ST may be reduced. On the other hand, when ff is below the lower limit value of the condition (5), the aberration correction effect by the lens unit at the reduction conjugate side as compared with the stop ST may be excess.

At least one reduction side movable lens unit in the zoom lens of the present embodiment preferably includes an air lens which satisfies the following condition (6).

$$\phi-/\phi+<-1.2 \quad (6)$$

The air lens in the embodiment has a meniscus shape which is constituted by a negative lens surface having a negative refractive power and a positive lens surface having a positive refractive power. $\phi-$ is a negative refractive power of the negative lens surface, and $\phi+$ is a positive refractive power of the positive lens surface.

When the change of the F-number caused by performing the zooming is reduced, an extremely large spherical aberration is generated in an under direction at the telephoto end and the correction is difficult because the on-axis light beam is extremely high at the wide angle end to the telephoto end in the zooming lens unit having a positive refractive power.

On the other hand, a power of the reduction side movable lens unit (fifth lens unit 50) is required to be low to some extent in order to obtain a moving amount needed for the aberration correction. Therefore, the air lens as described above is provided in the reduction side movable lens unit to generate a strong spherical aberration in an over direction without a high power of the reduction side movable lens unit itself. When $\phi-/\phi+$ is beyond the range of the condition (6), the correction effect of the spherical aberration may be reduced.

The zoom lens of the present embodiment satisfies the following condition (7).

$$Lb/L>0.05 \quad (7)$$

L is a total length of the zoom lens (a length between a top of a lens surface arranged at a position closest to the magnification conjugate side in the first lens unit 10 and a top of a lens surface arranged at a position closest to the reduction conjugate side in the sixth lens unit 60). Lb is a moving amount of a lens unit (fifth lens unit 50) which has the largest moving amount out of at least one reduction side movable lens unit.

When Lb/L is beyond the range of the condition (7), during the zooming, changes of the on-axis light beam height or the off-axis principal light beam in a lens unit at the reduction conjugate side as compared with the stop ST can not be obtained and an adequate aberration correction effect may not be obtained.

Further, the zoom lens of the present embodiment preferably satisfies the following conditions (8).

$$|f_W/bf|<0.60 \quad (8)$$

In the condition (8), bf is an air conversion value of a back focus of the zoom lens.

The condition (8) is a condition regarding the relationship between the back focus of the zoom lens and the focal distance of the whole zoom lens system. A back focus enough to arrange a color synthesis optical system 80 shown in FIG. 1 between the zoom lens and a light modulation device ID which is arranged at a reduction conjugate side plane can be obtained by satisfying the condition (8).

Relating to the conditions (5) to (8), the following conditions (5a) to (8a) are preferably satisfied.

$$100 < ff < 360 \tag{5a}$$

$$-2.00 < \phi_-/\phi_+ < -1.40 \tag{6a}$$

$$0.080 < Lb/L < 0.180 \tag{7a}$$

$$0.400 < |f_W/bf| < 0.560 \tag{8a}$$

Only upper limit values or lower limit values of the conditions (5) to (8) may be replaced with upper limit values or lower limit values of the conditions (5a) to (8a), respectively.

Table 1 shows a numerical example of the zoom lens of the present embodiment. In Table 1, f indicates a focal distance of the whole zoom lens system from the wide angle end to the telephoto end, FNO indicates an F-number, and ω indicates a half field angle.

The surface number i in Table 1 (A) is the number given to each lens surface in order from the magnification conjugate side to the reduction conjugate side. However, ID indicates a reduction conjugate surface (a modulation surface of the light modulation device). In Table 1(A), r indicates a radius of curvature of each lens surface, and d indicates an interval (physical interval) between a lens surface i and a lens surface (i+1) on an optical axis. The interval described as "variable" in Table 1(A) is changed in accordance with the zooming.

Nd and νd shown in Table 1 (A) respectively indicate a refractive index and an Abbe's number with respect to a d-line of a glass material constituting each lens element. A surface for which reference code * is attached at the right side of the surface number is an aspherical shape represented by the following function. Table 1(C) shows coefficients used for representing the aspherical shape. y indicates a coordinate in a diameter direction of the lens surface, and x indicates a coordinate in an optical axis direction. E-X indicates $10^{-X}$.

$$x = (y^2/R)/[1 + \{1-(1+K)(y^2/R^2)\}^{1/2}] + Ay^4 + By^6 + Cy^8 + Dy^{10} + Ey^{12}$$

Figure 2:
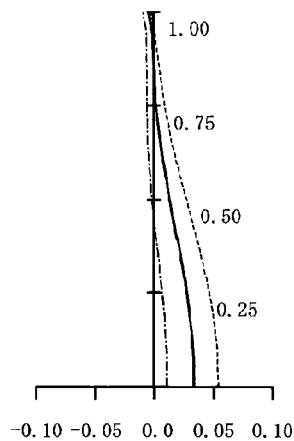
FIG. 2 is an aberration diagram of a zoom lens of Embodiment 1.
Figure 2:
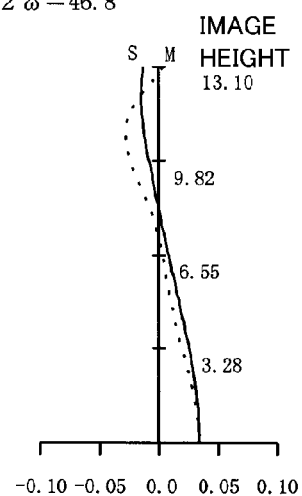
Figure 2:
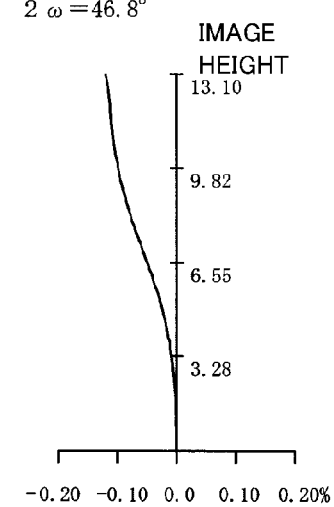
Figure 2:
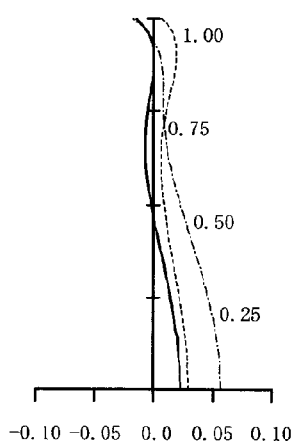
Figure 2:
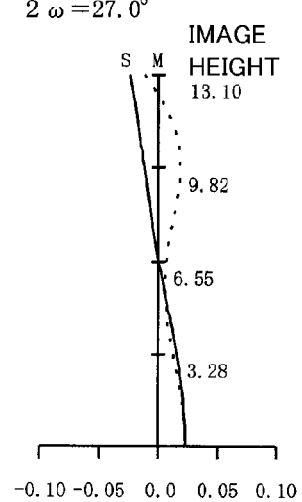
Figure 2:
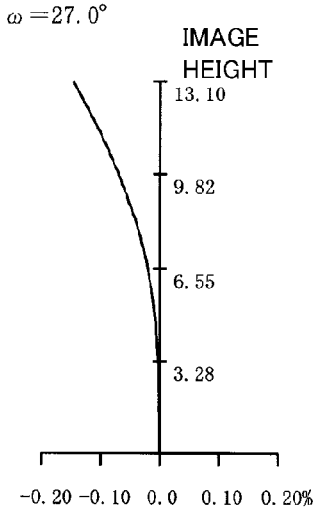

FIG. 2 shows a spherical aberration diagram, an astigmatism diagram, and a distortion diagram at the wide angle end and the telephoto end of the zoom lens of Embodiment 1.

TABLE 1

EMBODIMENT 1

| f | 30.3~54.7 |
|---|---|
| FNO | 2.00~2.10 |
| ω | 23.4°~13.5° |

(A)

| SURFACE NUMBER | r (mm) | d (mm) | Nd | vd |
|---|---|---|---|---|
| 1 | 37.06989 | 5.000 | 1.84666 | 23.78 |
| 2 | 24.48506 | 9.631 | | |
| 3 | 34.89594 | 5.000 | 1.84666 | 23.78 |
| 4 | 28.94599 | 5.992 | | |
| 5* | 152.84434 | 3.200 | 1.52996 | 55.80 |
| 6* | 40.31055 | 10.852 | | |
| 7 | −26.46739 | 5.000 | 1.51633 | 64.14 |
| 8 | −45.69863 | 0.479 | | |
| 9 | −636.65633 | 6.490 | 1.83400 | 37.16 |
| 10 | −57.00065 | VARIABLE | | |
| 11 | 127.68378 | 3.639 | 1.48749 | 70.24 |
| 12 | 453.24993 | VARIABLE | | |
| 13 | 88.12788 | 5.618 | 1.74320 | 49.34 |
| 14 | −1237.15164 | VARIABLE | | |
| 15 | −126.98282 | 2.000 | 1.72047 | 34.71 |
| 16 | ∞ | 6.339 | 1.84666 | 23.78 |
| 17 | 722.84072 | 2.728 | | |
| 18 | STO | VARIABLE | | |
| 19 | −1295.15805 | 2.000 | 1.76182 | 26.52 |
| 20 | 32.41414 | 9.192 | 1.48749 | 70.24 |
| 21 | −37.51828 | 1.722 | | |
| 22 | −30.48106 | 2.000 | 1.74950 | 35.28 |
| 23 | 69.30141 | 6.269 | 1.48749 | 70.24 |
| 24 | −76.76585 | 0.100 | | |
| 25 | 127.59388 | 8.856 | 1.49700 | 81.55 |
| 26 | −39.26627 | VARIABLE | | |
| 27 | 85.90838 | 5.027 | 1.84666 | 23.78 |
| 28 | −12212.30429 | 2.500 | | |
| 29 | ∞ | 43.000 | 1.51680 | 64.17 |
| 30 | ∞ | 5.000 | | |
| 31 | ∞ | 23.000 | 1.80518 | 25.43 |
| 32 | ∞ | 13.385 | | |

(B)

| | d10 | d12 | d14 | d18 | d26 |
|---|---|---|---|---|---|
| WIDE | 57.339 | 0.500 | 4.755 | 28.950 | 1.323 |
| MIDDLE | 12.704 | 18.429 | 29.625 | 17.627 | 14.482 |
| TELE | 0.753 | 0.890 | 43.494 | 14.588 | 33.142 |

(C)

| | r5 | r6 |
|---|---|---|
| R | 152.84434 | 40.31055 |
| K | 0.00000 | 0.00000 |
| A | 6.21678E−06 | −3.42988E−06 |
| B | −5.59737E−09 | −1.05626E−08 |
| C | 6.6858E−11 | 5.2907E−11 |
| D | −1.72601E−13 | −1.56271E−13 |
| E | 2.49518E−16 | 1.96587E−16 |

(D)

| | |
|---|---|
| VALUE IN CONDITION (1) | 1.05 |
| VALUE IN CONDITION (2) | 1.00 |
| VALUE IN CONDITION (3) | 0.963 |
| VALUE IN CONDITION (4) | 1.80 |
| VALUE IN CONDITION (5) | WIDE ANGLE END 109.23 (TELEPHOTO END) 212.63 |
| VALUE IN CONDITION (6) | −1.84 |
| VALUE IN CONDITION (7) | 0.1577 |
| VALUE IN CONDITION (8) | 0.5318 |

Embodiment 2

Figure 3:
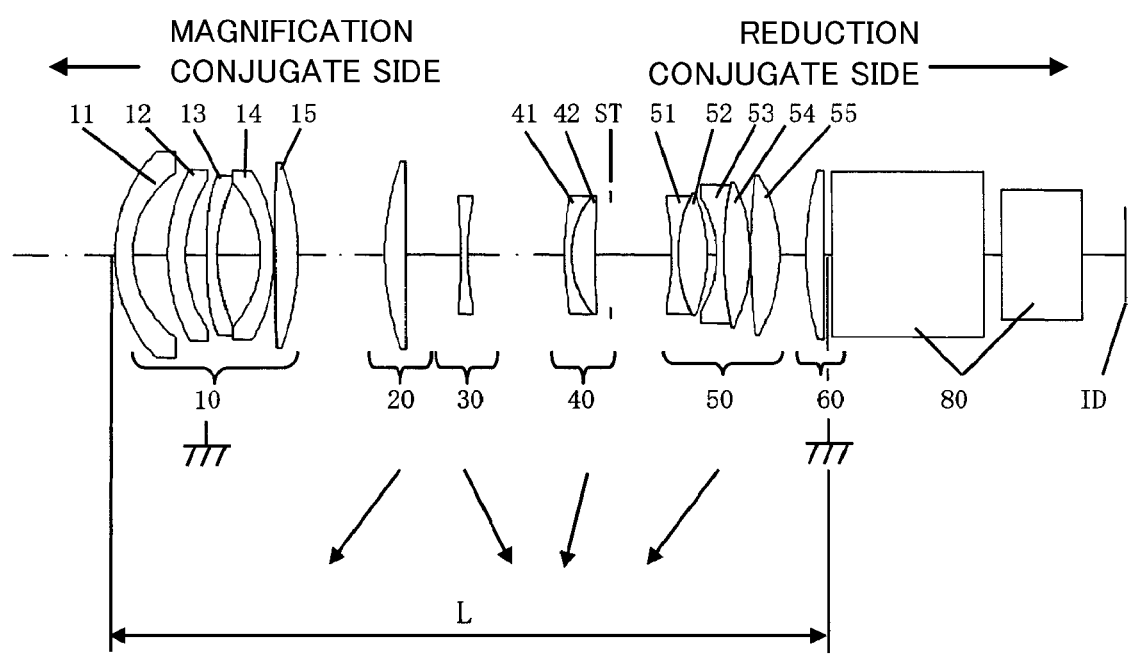
FIG. 3 is a cross-sectional diagram showing a configuration of a zoom lens that is Embodiment 2 of the present invention.

FIG. 3 shows an optical configuration at a wide angle end of a zoom lens that is Embodiment 2 of the present invention.

The zoom lens of the present embodiment includes first to sixth lens units 10 to 60 in order from the magnification conjugate side to the reduction conjugate side. The first to sixth lens units 10 to 60 include a total of fifteen lens elements.

The first to sixth lens units 10 to 60 have refractive powers of negative, positive, negative, positive, positive, and positive, respectively.

The first lens unit 10 corresponds to a "negative lens unit", and the second lens unit 20 corresponds to an "at least one positive lens unit". The fourth lens unit 40 corresponds to an "intermediate lens unit" including a stop ST. The first to third lens units 10 to 30 are a magnification side lens unit which is arranged at a magnification conjugate side as compared with the fourth lens unit 40 (stop ST). The fifth and sixth lens units 50 and 60 correspond to an "at least one reduction side lens unit" which is arranged at a reduction conjugate side as compared with the fourth lens unit 40 (stop ST).

In the zoom lens of the present embodiment, during zooming from the wide angle end to the telephoto end, the second, third, fourth and fifth lens units 20 to 50 are moved in respective arrow directions in FIG. 3. In other words, the second and third lens units (magnification side movable lens unit) 20 and 30 out of the magnification side lens unit and the fifth lens unit (reduction side movable lens unit) 50 out of the reduction side lens unit are moved.

Both the first lens unit 10 and the sixth lens unit 60 do not move (are fixed) during zooming.

The first lens unit 10 arranged at a position closest to the magnification conjugate side includes five lens elements 11 to 14 of negative, negative, negative, negative, and positive in order from the magnification conjugate side to the reduction conjugate side. Both surfaces of the lens element 13 are aspherical surfaces.

The second lens unit 20 and the third lens unit 30 have no more than one positive lens element and one negative lens element, respectively.

The fourth lens unit 40 is configured as a cemented lens element formed by cementing a negative lens element 41 and a positive lens element 42 which are arranged in order from the magnification conjugate side to the reduction conjugate side. The stop ST is arranged at the reduction conjugate side as compared with the cemented lens element.

The fifth lens unit 50 includes a cemented lens element of negative and positive lens elements 51 and 52, a cemented lens element of negative and positive lens elements 53 and 54, and a positive lens element 55, which are arranged in order from the magnification conjugate side to the reduction conjugate side.

The sixth lens unit 60, which is arranged at a position closest to the reduction conjugate side, includes one positive lens element.

The zoom lens of the present embodiment satisfies the conditions (1) to (9) described in Embodiment 1. In the zoom lens of the present embodiment, the third lens unit 30 having a negative refractive power is arranged at the magnification conjugate side as compared with the stop ST. Thus, the spherical aberration and the distortion are corrected by the magnification side lens unit, and a load of the aberration correction in the reduction side lens unit can be reduced. Further, a moving amount of each movable lens unit can be reduced.

Figure 4:
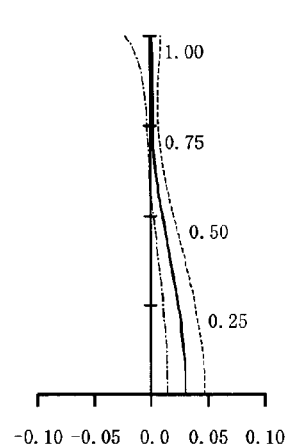
FIG. 4 is an aberration diagram of a zoom lens of Embodiment 2.
Figure 4:
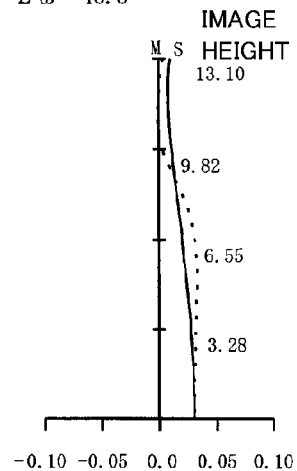
Figure 4:
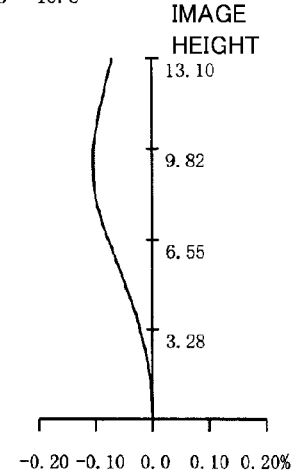
Figure 4:
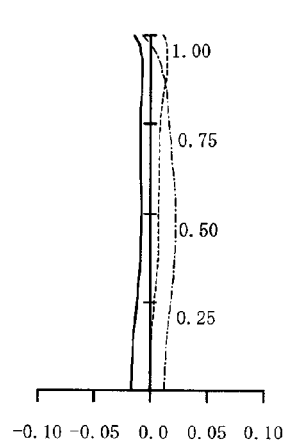
Figure 4:
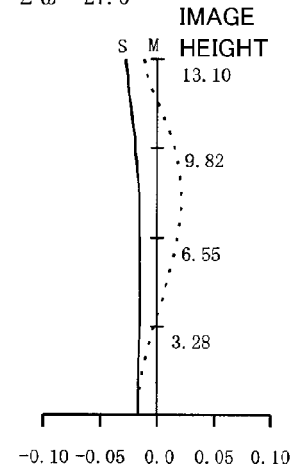
Figure 4:
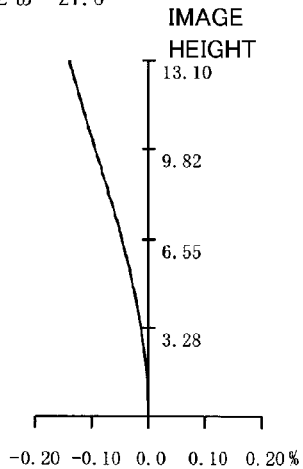

Table 2 shows a numerical example of the zoom lens of the present embodiment. FIG. 4 shows a spherical aberration diagram, an astigmatism diagram, and a distortion diagram at the wide angle end and the telephoto end of the zoom lens of Embodiment 2.

TABLE 2

EMBODIMENT 2

| f | 30.3~54.69 |
|---|---|
| FNO | 2.00~2.07 |
| ω | 23.4°~13.5° |

TABLE 2-continued

EMBODIMENT 2

(A)

| SURFACE NUMBER | r (mm) | d (mm) | Nd | vd |
|---|---|---|---|---|
| 1 | 40.71396 | 5.000 | 1.84666 | 23.78 |
| 2 | 27.24947 | 9.903 | | |
| 3 | 47.95901 | 5.000 | 1.84666 | 23.78 |
| 4 | 36.76322 | 5.853 | | |
| 5* | 154.57588 | 3.200 | 1.52996 | 55.80 |
| 6* | 46.96760 | 12.113 | | |
| 7 | −29.52063 | 4.078 | 1.48749 | 70.24 |
| 8 | −45.65684 | 0.100 | | |
| 9 | 802.59611 | 6.557 | 1.83400 | 37.16 |
| 10 | −71.32216 | VARIABLE | | |
| 11 | 76.37780 | 6.082 | 1.78590 | 44.20 |
| 12 | −13593.54213 | 15.300 | | |
| 13 | −184.14534 | 2.000 | 1.74400 | 44.79 |
| 14 | 73.89113 | VARIABLE | | |
| 15 | STO | 0.100 | | |
| 16 | 86.03465 | 2.000 | 1.80100 | 34.97 |
| 17 | 25.50964 | 6.788 | 1.84666 | 23.78 |
| 18 | 851.08817 | 4.403 | | |
| 19 | 0.00000 | VARIABLE | | |
| 20 | −75.66415 | 2.000 | 1.80518 | 25.43 |
| 21 | 39.01730 | 8.191 | 1.60300 | 65.44 |
| 22 | −41.19494 | 2.553 | | |
| 23 | −30.85771 | 2.000 | 1.68893 | 31.08 |
| 24 | 97.10162 | 7.373 | 1.48749 | 70.24 |
| 25 | −48.56306 | 0.100 | | |
| 26 | 166.33508 | 8.214 | 1.49700 | 81.55 |
| 27 | −45.42346 | VARIABLE | | |
| 28 | 80.58398 | 4.888 | 1.84666 | 23.78 |
| 29 | 1509.76105 | 2.500 | | |
| 30 | ∞ | 43.000 | 1.51680 | 64.17 |
| 31 | ∞ | 5.000 | | |
| 32 | ∞ | 23.000 | 1.80518 | 25.43 |
| 33 | ∞ | 12.279 | | |

(B)

| | d10 | d13 | d14 | d19 | d27 |
|---|---|---|---|---|---|
| WIDE | 24.499 | 15.300 | 27.184 | 17.017 | 7.504 |
| MIDDLE | 23.594 | 39.110 | 3.853 | 7.348 | 17.599 |
| TELE | 0.100 | 56.672 | 1.540 | 1.446 | 31.746 |

(C)

| | r5 | r6 |
|---|---|---|
| R | 154.57588 | 46.96760 |
| K | 0.00000 | 0.00000 |
| A | 7.46882E−06 | 1.27945E−06 |
| B | −1.12872E−08 | −1.51452E−08 |
| C | 5.00633E−11 | 5.04442E−11 |
| D | −8.91599E−14 | −9.98777E−14 |
| E | 8.60078E−17 | 9.16003E−17 |

(D)

| VALUE IN CONDITION (1) | 1.00 |
|---|---|
| VALUE IN CONDITION (2) | 1.00 |
| VALUE IN CONDITION (3) | 1.147 |
| VALUE IN CONDITION (4) | 1.80 |
| VALUE IN CONDITION (5) | WIDE ANGLE END 135.42 (TELEPHOTO END) 272.58 |
| VALUE IN CONDITION (6) | −1.53 |
| VALUE IN CONDITION (7) | 0.1212 |
| VALUE IN CONDITION (8) | 0.4989 |

Embodiment 3

Figure 5:
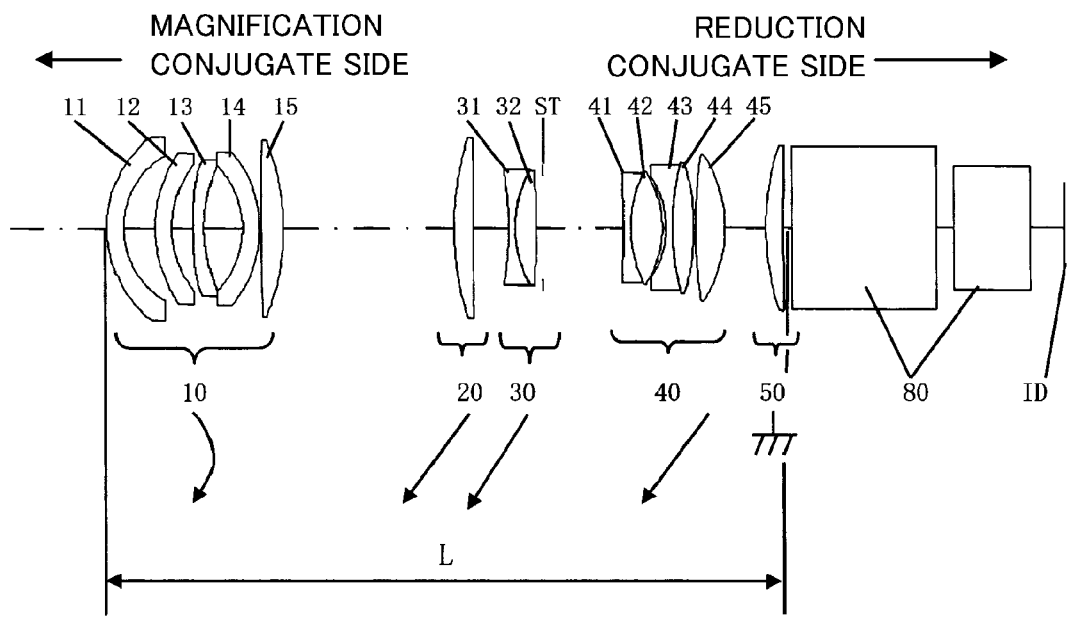
FIG. 5 is a cross-sectional diagram showing a configuration of a zoom lens that is Embodiment 3 of the present invention.

FIG. 5 shows an optical configuration at a wide angle end of a zoom lens that is Embodiment 3 of the present invention.

The zoom lens of the present embodiment includes first to fifth lens units 10 to 50 in order from a magnification conjugate side to a reduction conjugate side. The first to fifth lens units 10 to 50 include a total of fourteen lens elements.

The first to fifth lens units 10 to 50 have refractive powers of negative, positive, negative, positive, and positive, respectively.

The first lens unit 10 corresponds to a "negative lens unit", and the second lens unit 20 corresponds to an "at least one positive lens unit". The third lens unit 30 corresponds to an "intermediate lens unit" including a stop ST. The first and second lens units 10 and 20 are a magnification side lens unit which is arranged at the magnification conjugate side as compared with the third lens unit 30 (stop ST). The fourth and fifth lens units 40 and 50 correspond to an "at least one reduction side lens unit" which is arranged at the reduction conjugate side as compared with the third lens unit 30 (stop ST).

In the zoom lens of the present embodiment, during the zooming from the wide angle end to the telephoto end, the first, second, third, and fourth lens units 10 to 40 are moved in respective arrow directions in FIG. 5. In other words, the first and second lens units (magnification side movable lens unit) 10 and 20 arranged at the magnification conjugate side as compared with the third lens unit 30 and the fourth lens unit (reduction side movable lens unit) 40 arranged at the reduction conjugate side as compared with the third lens unit 30 are moved.

The fifth lens unit 50 does not move (is fixed) during zooming.

The first lens unit 10, which is arranged at a position closest to the magnification conjugate side, includes five lens elements 11 to 14 of negative, negative, negative, negative, and positive in order from the magnification conjugate side to the reduction conjugate side. Both surfaces of the lens element 13 are aspherical surfaces.

The second lens unit 20 has no more than one positive lens element.

The third lens unit 30 is configured as a cemented lens element formed by cementing a negative lens element 31 and a positive lens element 32 which are arranged in order from the magnification conjugate side to the reduction conjugate side. The stop ST is arranged at the reduction conjugate side as compared with the cemented lens element.

The fourth lens unit 40 includes a cemented lens element of negative and positive lens elements 41 and 42, a cemented lens element of negative and positive lens elements 43 and 44, and a positive lens element 45, which are arranged in order from the magnification conjugate side to the reduction conjugate side.

The fifth lens unit 50, which is arranged at a position closest to the reduction conjugate side, has no more than one positive lens element.

The zoom lens of the present embodiment satisfies the conditions (1) to (9). The zoom lens of the present embodiment moves the first lens unit 10 during the zooming to reduce one lens unit as compared with Embodiments 1 and 2 to make the configuration simple.

Figure 6:
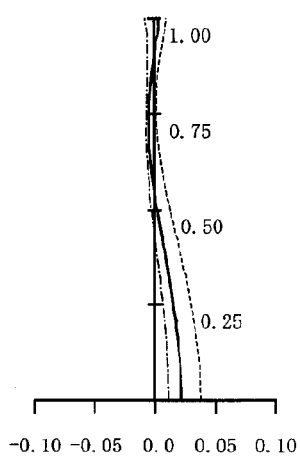
FIG. 6 is an aberration diagram of a zoom lens of Embodiment 3.
Figure 6:
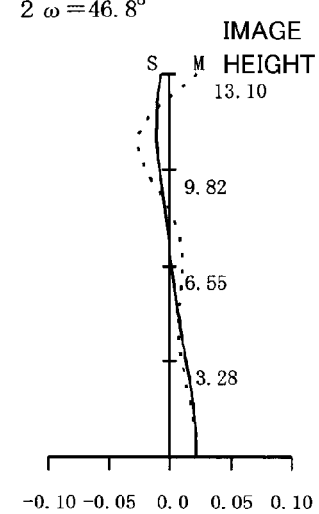
Figure 6:
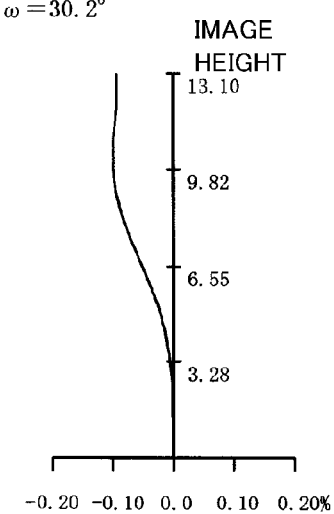
Figure 6:
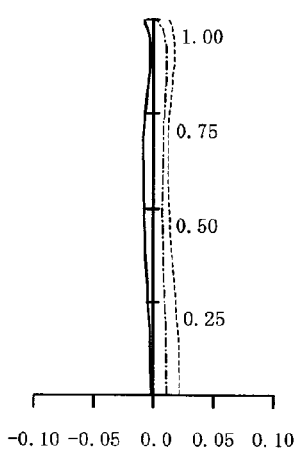
Figure 6:
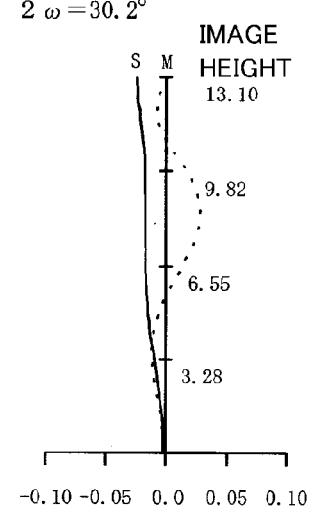
Figure 6:
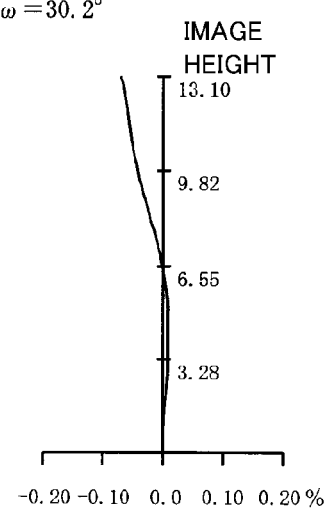

Table 3 shows a numerical example of the zoom lens of the present embodiment. FIG. 6 shows a spherical aberration diagram, an astigmatism diagram, and a distortion diagram at the wide angle end and the telephoto end of the zoom lens of Embodiment 3.

TABLE 3

EMBODIMENT 3
f 30.3~48.7
FNO 2.00~2.04
ω 23.4°~15.1°

(A)

| SURFACE NUMBER | r (mm) | d (mm) | Nd | νd |
|---|---|---|---|---|
| 1 | 33.60994 | 5.000 | 1.84666 | 23.78 |
| 2 | 24.37065 | 9.247 | | |
| 3 | 37.83295 | 5.000 | 1.84666 | 23.78 |
| 4 | 28.77573 | 6.287 | | |
| 5* | 135.74126 | 3.200 | 1.52996 | 55.80 |
| 6* | 39.06482 | 1.477 | | |
| 7 | −25.74861 | 5.000 | 1.77250 | 49.60 |
| 8 | −34.67766 | 0.500 | | |
| 9 | 1065.50402 | 6.515 | 1.83400 | 37.16 |
| 10 | −70.81837 | VARIABLE | | |
| 11 | 83.46965 | 5.722 | 1.80400 | 46.57 |
| 12 | −34832.4803 | VARIABLE | | |
| 13 | −91.54637 | 2.000 | 1.76200 | 40.10 |
| 14 | 33.88902 | 6.098 | 1.84666 | 23.78 |
| 15 | −284.01886 | 1.971 | | |
| 16 | STO | VARIABLE | | |
| 17 | −260.04137 | 2.000 | 1.78470 | 26.29 |
| 18 | 34.48600 | 9.321 | 1.48749 | 70.24 |
| 19 | −30.98326 | 1.098 | | |
| 20 | −27.36420 | 2.000 | 1.66680 | 33.05 |
| 21 | 74.87496 | 6.187 | 1.48749 | 70.24 |
| 22 | −69.32387 | 0.500 | | |
| 23 | 139.01219 | 8.664 | 1.49700 | 81.55 |
| 24 | −39.89731 | VARIABLE | | |
| 25 | 76.73620 | 5.070 | 1.84666 | 23.78 |
| 26 | 736.82336 | 2.500 | | |
| 27 | ∞ | 43.000 | 1.51680 | 64.17 |
| 28 | ∞ | 5.000 | | |
| 29 | ∞ | 23.000 | 1.80518 | 25.43 |
| 30 | ∞ | 10.167 | | |

(B)

| | d10 | d12 | d16 | d24 |
|---|---|---|---|---|
| WIDE | 50.570 | 10.436 | 23.816 | 12.321 |
| MIDDLE | 19.837 | 33.035 | 16.487 | 20.286 |
| TELE | 0.500 | 57.468 | 7.036 | 28.593 |

(C)

| | r5 | r6 |
|---|---|---|
| R | 135.74126 | 39.06482 |
| K | 0.00000 | 0.00000 |
| A | 4.90318E−06 | −5.04603E−06 |
| B | −3.52520E−09 | −7.75851E−09 |
| C | 7.44657E−11 | 5.56694E−11 |
| D | −2.05527E−13 | −1.76811E−13 |
| E | 2.85780E−16 | 2.15243E−16 |

(D)

| | |
|---|---|
| VALUE IN CONDITION(1) | 1.02 |
| VALUE IN CONDITION(2) | 1.00 |
| VALUE IN CONDITION(3) | 0.917 |
| VALUE IN CONDITION(4) | 1.60 |
| VALUE IN CONDITION(5) | WIDE ANGLE END 177.22 (TELEPHOTO END) 326.66 |
| VALUE IN CONDITION(6) | −1.55 |
| VALUE IN CONDITION(7) | 0.0990 |
| VALUE IN CONDITION(8) | 0.5178 |

In Embodiments 1 and 2, a positive fifth lens unit and a positive sixth lens unit are described as an example of a lens unit (lens group) corresponding to the "at least one reduction side lens unit". In Embodiment 3, a positive fourth lens unit and a positive fifth lens unit are described as the example.

However, the "at least one reduction side lens unit" can be constituted by one lens unit. For example, in Embodiments 1 and 2, the sixth lens unit may be moved integrally with the fifth lens unit, and the sixth lens unit may be configured integrally with the color synthesis optical system 80, i.e. a refractive power may be given to a prism surface of the color synthesis optical system 80. In Embodiment 3, the fifth lens unit may be moved integrally with the fourth lens unit. The refractive powers of these lens units are preferably positive refractive powers, but negative refractive powers may also be applicable.

Embodiment 4

Figure 7:
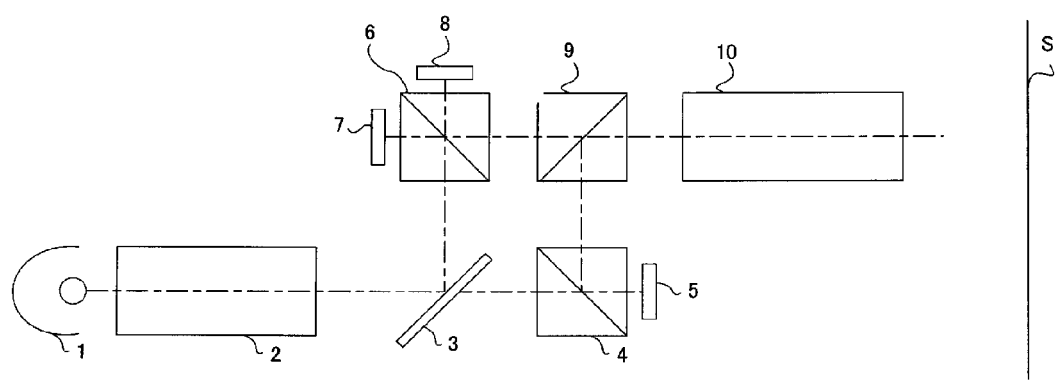
FIG. 7 is a diagram showing a configuration of a liquid crystal projector that is Embodiment 4 of the present invention.

FIG. 7 shows a configuration of a reflective liquid crystal projector as an image projection apparatus where the zoom lens described in Embodiments 1 to 3 is used as a projection lens.

In FIG. 7, reference numeral 1 denotes a light source lamp, and it emits white light. Reference numeral 2 denotes an illumination optical system, and it converts non-polarized light from the light source lamp 1 into linear polarized light having a specific polarization direction or splits the light from the light source lamp 1 into a plurality of light beams to overlap them on liquid panels 5, 7, and 8.

Reference numeral 3 denotes a dichroic mirror, and it separates the white light from the illumination optical system 2 into first colored light (for example, green light) and second and third colored lights (for example, red light and blue light). Reference numeral 4 denotes a first polarization beam splitter, and it transmits the first colored light (for example, P-polarized light) transmitted through the dichroic mirror 3 to reach a first reflective liquid crystal panel (light modulation device) 5. The first reflective liquid crystal panel performs an image modulation of the incident first colored light and reflects it. The first colored light (for example, S-polarized light) modulated by the first reflective liquid crystal panel 5 is reflected by the first polarization beam splitter 4 to reach a color synthesis prism 9.

Reference numeral 6 denotes a second polarization beam splitter, and it reflects a second colored light (for example, S-polarized light) reflected by the dichroic mirror 3 to reach a second reflective liquid crystal panel (light modulation device) 7. The second reflective liquid crystal panel 7 performs an image modulation of the incident second colored light and reflects it. The second colored light (for example, P-polarized light) modulated by the second reflective liquid crystal panel 7 transmits through a second polarization beam splitter 6 to reach the color synthesis prism (color synthesis optical system) 9.

The second polarization beam splitter 6 transmits third colored light (for example, P-polarized light) reflected by the dichroic mirror 3 to reach a third reflective liquid crystal panel (light modulation device) 8. The third reflective liquid panel 8 performs an image modulation of the incident third colored light and reflects it. The third colored light (for example, S-polarized light) modulated by the third reflective liquid crystal panel 8 is reflected by the second polarization beam splitter 6 to reach the color synthesis prism 9.

The color synthesis prism 9 synthesizes the first to third colored lights to guide the synthesized lights to the projection lens (the zoom lens described in any one of Embodiments 1 to 3) 10. The projection lens 10 projects the synthesized first to third colored lights on a screen that is a plane to be projected.

According to each of the above embodiments, a zoom lens which is a telecentric optical system where a back focus is adequately secured and has a high variable magnification ratio and a large diameter, and in addition brightness changes in accordance with the zooming is small, without a variable stop, and an image projection apparatus using the zoom lens can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in Embodiments 1 to 3, the case where a physical stop is used as a stop has been described, but a lens surface may be used as a stop. The stop may be arranged at a position where the height of the off-axis principal light beam is the lowest. Further, a lens unit (intermediate lens unit) including a stop may be used as a lens unit in which a maximum effective diameter is the smallest.

In Embodiments 1 to 3, the zoom lens in which the reduction side movable lens unit includes one lens unit has been described, but the reduction side movable lens unit may also include two or more lens units.

In Embodiment 4, the reflective liquid crystal projector using a reflective liquid crystal panel has been described, but as an image projection apparatus of the present invention, a transmissive liquid crystal projector using a transmissive liquid crystal panel may also be applicable. An image projection apparatus using a digital micromirror device (DMD) as a light modulation device may also be applicable.

This application claims the benefit of Japanese Patent Application No. 2008-244536, filed on Sep. 24, 2008, which is hereby incorporated by reference herein in its entirety.

What is claimed is:

1. A zoom lens comprising, in order from a magnification conjugate side to a reduction conjugate side:

a negative lens unit having a negative refractive power;

at least one positive lens unit having a positive refractive power;

an intermediate lens unit including a stop; and at least one reduction side lens unit, wherein at least two magnification side movable lens units out of the negative lens unit and the at least one positive lens unit, and at least one reduction side movable lens unit out of the at least one reduction side lens unit are moved during zooming, and wherein the following conditions are satisfied:

$$0.9 < (X_T \cdot \beta_{Tb} \cdot \phi_W)/(X_W \cdot \beta_{Wb} \cdot \phi_T) < 1.1$$

$$0.9 < \phi_W/\phi_T < 1.1$$

$$0.8 < (\beta_{TS} \cdot \beta_{Tb})/(\beta_{WS} \cdot \beta_{Wb}) < 1.2$$

$$1.4 < f_T/f_W$$

where $X_W$ indicates an interval between a focal position at a wide angle end, of a front synthetic system constituted by lens elements arranged at the magnification conjugate side as compared with the stop, and the stop, $\beta_{Wb}$ indicates an imaging magnification at the wide angle end, of a rear synthetic system constituted by lens elements arranged at the reduction conjugate side as compared with the stop, $\beta_{WS}$ indicates an imaging magnification of the intermediate lens unit at the wide angle end, $\phi_W$ indicates a diameter of the stop at the wide angle end, $X_T$ indicates an interval between a focal position at a telephoto end, of the front synthetic system, and the stop, $\beta_{Tb}$ indicates an imaging magnification at the telephoto end, of the rear synthetic system, $\beta_{TS}$ indicates an imaging magnification of the intermediate lens unit at the telephoto end, $\phi_T$ indicates a diameter of the stop at the telephoto end, $f_W$ indicates a focal distance of a whole zoom lens system at the wide angle end, and $f_T$ indicates a focal distance of the whole zoom lens system at the telephoto end.

2. A zoom lens according to claim 1,
wherein an interval between the intermediate lens unit and a lens unit which is arranged at a position closest to the intermediate lens unit out of the at least one reduction side lens unit is reduced during the zooming from the wide angle end to the telephoto end, and
wherein the following condition is satisfied:

$$80 < ff < 800$$

where ff is a focal length of a synthetic system formed by synthesizing the negative lens unit, the at least one positive lens unit and the intermediate lens unit.

3. A zoom lens according to claim 1,
wherein the at least one reduction side movable lens unit includes an air lens having a meniscus shape which is constituted by a negative lens surface having a negative refractive power and a positive lens surface having a positive refractive power, and
wherein the following condition is satisfied:

$$\phi-/\phi+ < -1.2$$

where $\phi-$ is the negative refractive power of the negative lens surface, and $\phi+$ is the positive refractive power of the positive lens surface.

4. A zoom lens according to claim 1,
wherein the following condition is satisfied:

$$Lb/L > 0.05$$

where L is a total length of the zoom lens at the wide angle end, and Lb is a moving amount of a lens unit which has the largest moving amount from the wide angle end to the telephoto end out of the at least one reduction side movable lens unit.

5. A zoom lens according to claim 1,
wherein the following condition is satisfied:

$$|f_W/bf| < 0.60$$

where bf is an air conversion value of a back focus of the zoom lens.

6. A zoom lens according to claim 1,
wherein a lens unit which is arranged at a position closest to the reduction conjugate side out of the at least one reduction side lens unit does not move during the zooming, and has no more than one positive lens element.

7. A zoom lens according to claim 1,
wherein the positive lens unit has no more than one positive lens element.

8. A zoom lens according to claim 1,
wherein the intermediate lens unit has no more than the stop and one cemented lens element.

9. An image projection apparatus comprising:
a light modulation device configured to modulate light; and
a zoom lens configured to project the light from the light modulation device onto a plane to be projected,
wherein the zoom lens comprises, in order from a magnification conjugate side to a reduction conjugate side:
a negative lens unit having a negative refractive power;
at least one positive lens unit having a positive refractive power;
an intermediate lens unit including a stop; and
at least one reduction side lens unit,
wherein at least two magnification side movable lens units out of the negative lens unit and the at least one positive lens unit, and at least one reduction side movable lens unit out of the at least one reduction side lens unit are moved during zooming, and
wherein the following conditions are satisfied:

$$0.9 < (X_T \cdot \beta_{Tb} \cdot \phi_W)/(X_W \cdot \beta_{Wb} \cdot \phi_T) < 1.1$$

$$0.9 < \phi_W/\phi_T < 1.1$$

$$0.8 < (\beta_{TS} \cdot \beta_{Tb})/(\beta_{WS} \cdot \beta_{Wb}) < 1.2$$

$$1.4 < f_T/f_W$$

where $X_W$ indicates an interval between a focal position at a wide angle end, of a front synthetic system constituted by lens elements arranged at the magnification conjugate side as compared with the stop, and the stop, $\beta_{Wb}$ indicates an imaging magnification at the wide angle end, of a rear synthetic system constituted by lens elements arranged at the reduction conjugate side as compared with the stop, $\beta_{WS}$ indicates an imaging magnification of the intermediate lens unit at the wide angle end, $\phi_W$ indicates a diameter of the stop at the wide angle end, $X_T$ indicates an interval between a focal position at a telephoto end, of the front synthetic system, and the stop, $\beta_{Tb}$ indicates an imaging magnification at the telephoto end, of the rear synthetic system, $\beta_{TS}$ indicates an imaging magnification of the intermediate lens unit at the telephoto end, $\phi_T$ indicates a diameter of the stop at the telephoto end, $f_W$ indicates a focal distance of a whole zoom lens system at the wide angle end, and $f_T$ indicates a focal distance of the whole zoom lens system at the telephoto end.

* * * * *